(12) United States Patent
Browne et al.

(10) Patent No.: US 8,201,850 B2
(45) Date of Patent: Jun. 19, 2012

(54) ADJUSTABLE BELT TENSIONING UTILIZING ACTIVE MATERIAL ACTUATION

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 469 days.

(21) Appl. No.: 12/427,900

(22) Filed: Apr. 22, 2009

(65) Prior Publication Data

US 2009/0266925 A1 Oct. 29, 2009

Related U.S. Application Data

(60) Provisional application No. 61/048,170, filed on Apr. 26, 2008.

(51) Int. Cl.
*B60R 22/00* (2006.01)
*B60R 22/48* (2006.01)
(52) U.S. Cl. ..................... 280/801.1; 297/468
(58) Field of Classification Search .................. 280/807, 280/808, 801.1; 297/471, 468, 479, 483, 297/474
See application file for complete search history.

(56) References Cited

U.S. PATENT DOCUMENTS

| 6,655,743 | B1 * | 12/2003 | Parizat et al. | 297/477 |
| 7,258,188 | B2 * | 8/2007 | Chernoff et al. | 180/268 |
| 7,905,517 | B2 * | 3/2011 | Melz et al. | 280/753 |
| 7,967,339 | B2 * | 6/2011 | Usoro et al. | 280/801.2 |
| 8,025,339 | B2 * | 9/2011 | Usoro et al. | 297/481 |
| 2006/0125291 | A1 * | 6/2006 | Buravalla et al. | 296/204 |
| 2009/0218859 | A1 * | 9/2009 | Lawall et al. | 297/216.1 |
| 2009/0267339 | A1 * | 10/2009 | Usoro et al. | 280/807 |
| 2010/0066151 | A1 * | 3/2010 | Usoro et al. | 297/481 |
| 2010/0162530 | A1 * | 7/2010 | Schramm | 24/166 |

FOREIGN PATENT DOCUMENTS

| JP | 63-258239 A | | 10/1988 |
| JP | 02231247 A | * | 9/1990 |
| JP | 03021546 A | * | 1/1991 |
| JP | 03-067751 A | | 3/1991 |
| JP | 03067751 A | * | 3/1991 |
| JP | 03079448 A | * | 4/1991 |
| JP | 2002-240680 A | | 8/2002 |

* cited by examiner

*Primary Examiner* — Drew Brown

(57) ABSTRACT

A restraining belt comprising a webbing, and utilizing active material actuation for selectively modifying the tensile load strength of, stiffness of, or the tensioning applied to the webbing.

20 Claims, 2 Drawing Sheets

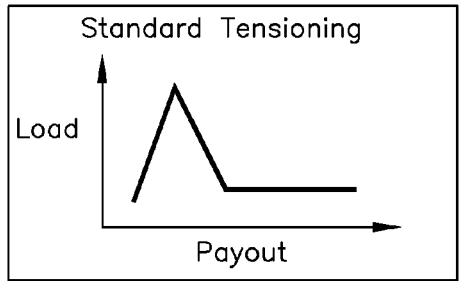
FIG. 1
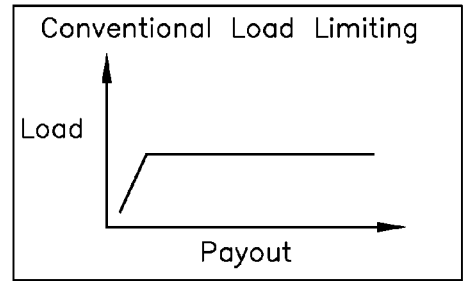
FIG. 2
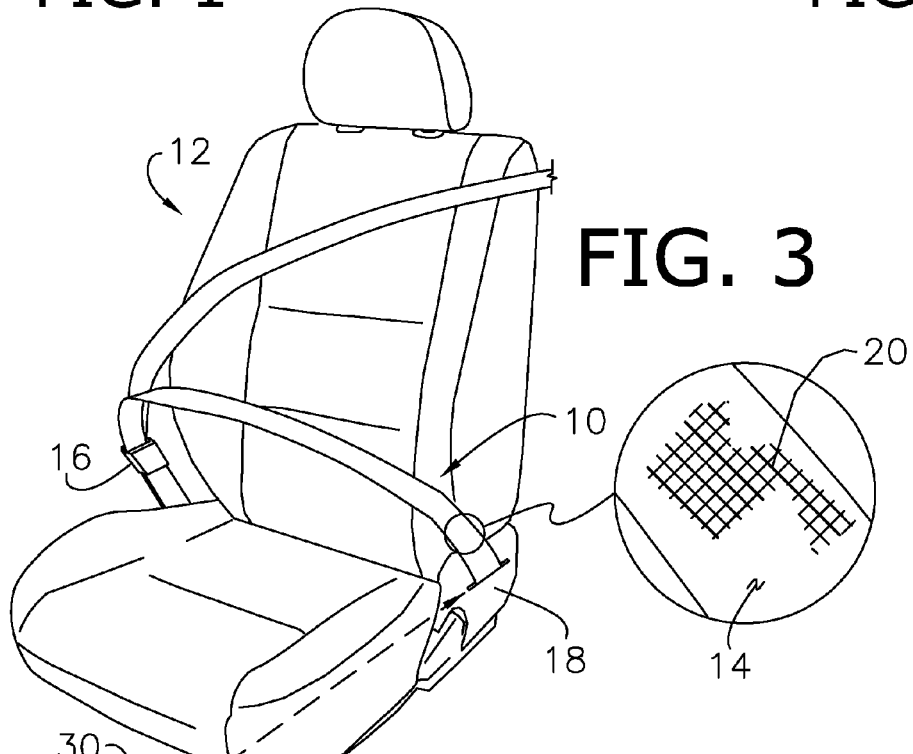
FIG. 3
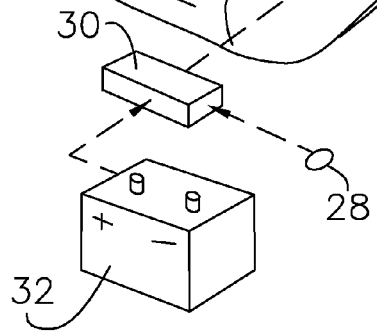
FIG. 3a
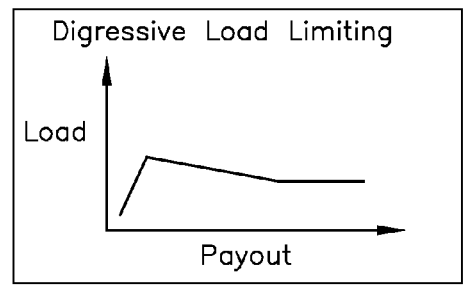

ADJUSTABLE BELT TENSIONING UTILIZING ACTIVE MATERIAL ACTUATION

RELATED APPLICATIONS

This patent application claims priority to, and benefit from U.S. Provisional Patent Application Ser. No. 61/048,170, entitled "SEAT BELT WEBBING COMPRISING ACTIVE MATERIAL ELEMENTS," filed on Apr. 26, 2008, the disclosure of which is incorporated by reference herein.

BACKGROUND OF THE INVENTION

1. Field of the Invention

The present disclosure generally relates to seat belts, and otherwise restraining straps that experience tensile loads in use. More particularly, the invention concerns a belt or strap that utilizes active material actuation to selectively modify tension therein.

2. Discussion of Prior Art

The use of seat belts and otherwise restraining straps (i.e., collectively referred to herein as "restraining belts") are widely used in various arts for securing occupants and/or cargo. In a vehicular setting, for example, these safety devices typically include a flexible planar member (e.g., webbing) operable to sustain a tensile load when serving as a restraint, a clasp or fastener (e.g., buckle) for fixing the restraint, and a retractor operable to tension the belt once applied as a restraint. The retractor is typically configured to automatically lock upon a sudden stop or crash event by a pendulum and locking bar that engages an otherwise spring biased sprocket coupled to the webbing.

Concernedly, and with respect to the present invention, conventional restraining belts typically provide a constant magnitude of tension. During a crash event, for example, a normally suitable amount of tension generated by the locked retractor may cause greater peak forces to be transferred to the occupant or cargo through the webbing. FIG. 1 presents an exemplary load versus payout (i.e., rate of dispensing belt webbing) graph during such an event. As a result, load limiting retractors have been developed to limit the achievable tensile loads on the belt and therefore, the transferable peak forces upon the occupant. However, these retractors also present various concerns in the art. For example, and as shown in FIG. 2, once triggered, conventional load limiting devices typically produce an instantaneous and constant limited load. Moreover, these types of retractors often employ complex electro-mechanical actuators that increase operational, energy consumption, and repair/maintenance costs.

BRIEF SUMMARY

The present invention addresses these concerns, among others, by presenting a seat belt that utilizes active material actuation to selectively modify the tension therein when used as a restraint. The invention is useful for providing a means for advantageously adjusting the tension in the belt when a predetermined condition or event occurs or based on occupant anthropometry and/or preference. For example, the invention is useful for relaxing the tension in the belt during a sudden stop or crash event, so as to modulate the forces that may be imparted upon the occupant or cargo during the event. In addition to limiting the peak force, the inventive belt is further useful for tailoring the force profile over time to achieve digressive load-limiting. Finally, it is appreciated that the use of active material actuators in place of mechanical actuators such as solenoids, servo-motors, and the like, reduces complexity, required packaging space, weight, and noise (both acoustic and with respect to electromagnetic field (EMF) outputs) during operation.

In a first aspect, the invention generally recites a belt webbing adapted to secure an occupant or cargo under a tensile load, wherein the belt presents a first tensile load strength and longitudinal profile. The webbing includes at least one active material element operable to undergo a reversible change in fundamental property when exposed to or occluded from an activation signal, so as to be activated and deactivated respectively. The change is configured to modify the tensile load strength to a second strength less than the load, thereby eliminating the necessity for a complex load limiting retractor. Among others, active materials such as shape memory alloys, and electroactive polymers are particularly suitable for use in the present invention.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is a line graph depicting load versus payout for a traditional non-limiting seat belt;

FIG. 2 is a line graph depicting load versus payout for a conventional load limiting seat belt;

FIG. 3 is a perspective view of an automotive seat and seat belt including an active webbing and retractor, in accordance with a preferred embodiment of the invention;

FIG. 3*a* is a line graph depicting load versus payout for a digressive load limiting restraining belt, in accordance with a preferred embodiment of the invention;

DETAILED DESCRIPTION

Figure 4:
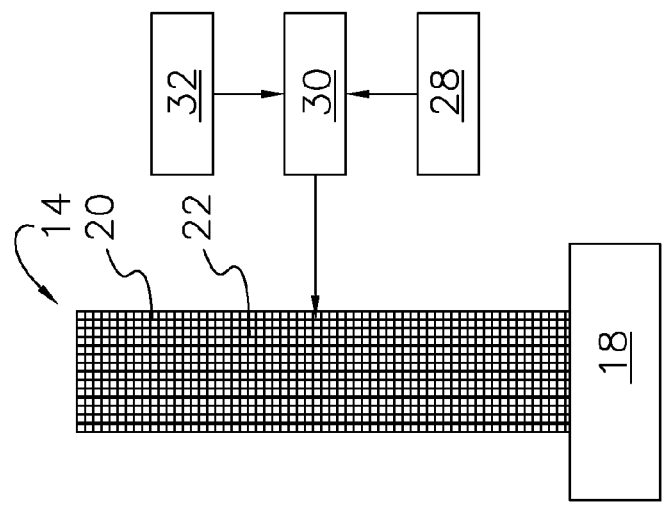
FIG. 4 is an elevation view of a seat belt webbing comprising a plurality of longitudinally oriented active material wires, and diagrammatically a retractor, sensor, controller, and source, in accordance with a preferred embodiment of the invention.

The present invention concerns a restraining belt 10 adapted for securing an occupant or cargo (not shown). The invention is described and illustrated herein with respect to a vehicular seat 12 (FIG. 3) and is applicable to all seating positions in cars, trucks, planes, amusement rides, etc.; however, it is appreciated that the advantageous of the belt 10 may be employed by other load limiting devices, such as with respect to cargo transportation, and cranes. Thus, as previously mentioned, the term "restraining belt" shall include seat belts (both lap and shoulder belts), straps, tethers, and other similar geometric forms that operate under a tensile load to secure occupants and/or cargo.

In the illustrated embodiment, the belt 10 comprises a webbing 14 for wrapping around the occupant or cargo, a buckle (e.g., clasp or fastener) 16 for securing the webbing 14 in the wrapped condition, and a retractor 18 drivenly coupled to the webbing 14 and operable to produce a first tensile load therein. The tensile load is used to transmit a holding force to the occupant or cargo. As such, it is appreciated that the material and construction (e.g., weaving) of the webbing 14 is sufficiently configured to present a normal tensile load strength greater than the load typically applied by the retractor 18 and occupant/cargo. Except as otherwise specified herein, suitable webbing material may include polyester blends and other conventional materials.

The inventive belt 10 further includes at least one, and more preferably, a plurality of active material elements 20 operable to selectively vary the tension in the belt 10, and more particularly, the stiffness of, the applied tensioning to, and/or the tensile load strength of the webbing 14, so as to achieve a second stiffness, tension, or strength. With respect to the latter, it is appreciated that where the second tensile load strength is less than the normal, the belt 12 may be caused to advantageously "give" under the load of the occupant or cargo, thereby resulting in load limiting. More preferably, the inventive belt 10 is operable to tailor the load in a digressive load-limiting manner (FIG. 3*a*).

In the illustrated embodiment, the element 20 presents straight and curvilinear wire configurations, wherein the term "wire" is used in a non-limiting sense, and encompasses other geometric forms, including fibers, planar strands or strips, threads, braids, filaments, and weaves.

The term "active material" as used herein generally refers to a material that exhibits a reversible change in a fundamental property such as dimension, shape, orientation, shear force, or flexural modulus upon application or removal of an activation signal, as understood by those of ordinary skill in the art. Suitable active materials, for use in the present invention include, without limitation, shape memory alloys (SMA), ferromagnetic shape memory alloys, electroactive polymers (EAP), and the like.

Depending on the particular active material, the activation signal can take the form of, without limitation, an electric current, an electric field (voltage), a temperature change, a magnetic field, a mechanical loading or stressing, and the like. For example, a heat signal may be applied for changing the property of thermally activated active materials such as SMA. An electrical signal may be applied for changing the property of the active material fabricated from electroactive materials, such as EAP.

Desirably, the change in the property of the active material remains for the duration of the applied activation signal. In one embodiment, upon discontinuation of the activation signal, the property of the active material generally reverts to an unpowered form and returns substantially to its original property. More preferably, and as further described herein, a return mechanism 22 capable of providing a force opposite to the actuation force of the active material is provided, and may include, without limitation, springs, elastomers, additional active materials, and the like.

In the present invention, a plurality of elements 20 is preferably provided to increase stability, redundancy, and flexibility. Subdivisions and/or combinations of active material can provide additional desirable device benefits, such as improved package size, reduced weight, increased design scalability, a stacked or staggered actuation to improve controllable resolution, an active reset spring, or differential actuation via antagonistic wire configurations. The active material subdivisions may be configured electrically or mechanically in series or parallel and mechanically connected in telescoping, stacked, or staggered configurations. The electrical configuration may be modified during operation by software timing, circuitry timing, and external or actuation induced electrical contact.

More particularly, it is appreciated that shape memory alloys (SMA) exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature (As). The temperature at which this phenomenon is complete is called the Austenite finish temperature (Af). When the shape memory alloy is in the Austenite phase and is cooled, it begins to change into the Martensite phase, and the temperature at which this phenomenon starts is referred to as the Martensite start temperature (Ms). The temperature at which Austenite finishes transforming to Martensite is called the Martensite finish temperature (Mf).

Generally, SMA is softer and more easily deformable in the Martensitic phase and harder, stiffer, and/or more rigid in the Austenitic phase. In view of the foregoing properties, expansion of the shape memory alloy is preferably at or below the Austenite transition temperature (at or below As). Subsequent heating above the Austenite transition temperature causes the expanded shape memory alloy to revert back to its permanent shape. Thus, a suitable activation signal for use with SMA is a thermal activation signal having a magnitude to cause transformations between the Martensite and Austenite phases.

The temperature at which the SMA remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between Martensite and Austenite. Additionally FSMA are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a prestrained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has a maximum elastic modulus of about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Returning to the structural configuration of the present invention, there is variably shown FIGS. 3 through 7 plural embodiments, wherein SMA, EAP, or other shape memory material capable of functioning as an actuator in wire or fibrous form may be used to construct the webbing 14. In FIG. 4, the elements 20 are arranged parallel to the length or longitudinal profile of the webbing 14; however, it is certainly within the ambit of the invention for the wires to present diagonal or a cross-hatch pattern (not shown).

Where normally Martensitic SMA (i.e., SMA having a transition temperature substantially greater than the anticipated operating temperature) is utilized, the wire elements 20 (FIGS. 3 and 4) are preferably pre-stretched or pre-stained up to 8% to remove slack prior to actuation. Here, the SMA elements 20 are configured to be rapidly heated through Joule heating, so as to induce transformation, contraction and increased stiffness within the webbing 14. This, in turn, increases the hold force applied to the occupant or cargo. That is to say, where the retractor 18 is locked, the shortening of the SMA elements 20 and increased stiffness will further tension the belt 10 and reduce its ability to stretch under occupant loading. After transformation to the Austenitic state, it is appreciated that high stressing during a sudden stop or crash event will produce a stress induced phase change back to the Martensitic state. In this sense, the superelasticity of the Austenitic SMA elements 20 will further result in energy dissipation and load limiting.

Conversely, the SMA elements 20 may initially present a normally Austenitic state that is caused to transform as a result of crash (or sudden stop) loading, as previously described. Here, upon removal of the loading the elements 20 will transition back to the Austenitic state and return to the original configuration. Finally, in another alternative, it is appreciated that the element 20 may present a normally Martensitic transition temperature, but be normally activated, such that modification of the belt 10 occurs upon occlusion from or removal of the activation signal.

Figure 5:
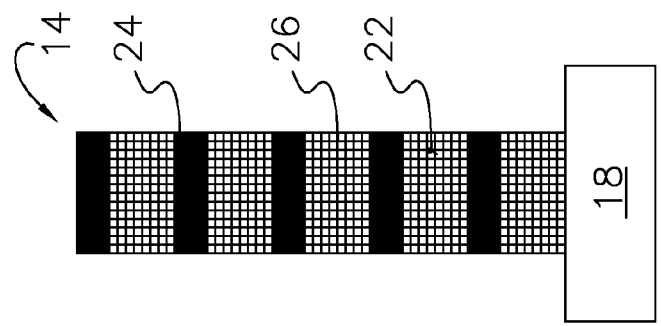
FIG. 5 is an elevation view of a seat belt webbing comprising a plurality of laterally oriented active material strips, and a retractor, in accordance with a preferred embodiment of the invention.

In FIG. 5, the webbing 14 includes a plurality of laterally oriented active material strips 24 that interconnect non-active webbing segments 26. The strips 24 present a longitudinal axis that generally traverses, and are more preferably, orthogonal to the longitudinal axis or profile of the webbing 14. The strips 22 may be integrally formed of or impregnated with the active material elements 20, and are electrically and/or thermally conductive, so as to facilitate activation of the material. The strips 22 are preferably formed of stretchable material or present an expandable configuration, so as to present a first modulus of elasticity when the element is activated and a second modulus when deactivated.

Figure 6:
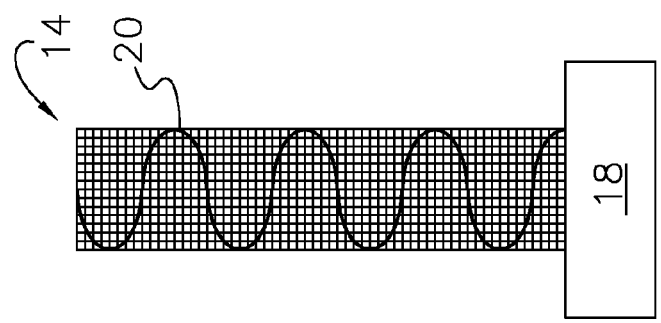
FIG. 6 is an elevation view of a seat belt webbing comprising a longitudinally oriented active material wire presenting a sinusoidal configuration, and a retractor, in accordance with a preferred embodiment of the invention.

As shown in FIG. 6, the webbing 14 may include at least one longitudinally oriented active material wire 20 presenting a planar spring having a sinusoidal configuration. Here, the wire 20 is preferably formed of normally Martensitic SMA, so as to present a first spring modulus when deactivated, and a second stiffer modulus when activated by a thermal signal. It is appreciated that activation of the element 20 will result in both the contraction of the wire 20 and increased stiffness in the spring, which combine to further tension the webbing 14.

Figure 7:
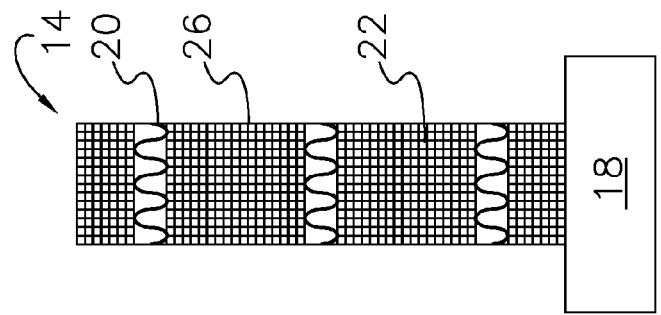
FIG. 7 is an elevation view of a seat belt webbing comprising a plurality of laterally oriented active material wires presenting sinusoidal configurations, and a retractor, in accordance with a preferred embodiment of the invention.

In the embodiment shown in FIG. 7, a plurality of laterally oriented and equally spaced sinusoidal elements 20 interconnects pluralities of non-active belt segments 26. The segments 26 are coupled to the elements 20 at the crests and troughs of the wave form, and impart tensile forces thereto when the belt 10 is under tension. The elements 20 present a first tensile load strength that produces a first amplitude when activated, and a second strength and amplitude when deactivated. The element 20 may be formed of SMA in either a Martensitic or Austenitic state. In the former, it is appreciated that activation will cause the elements to pull, so as to stretch, the segments inward, thereby resulting in a stiffer webbing 14, and shorter second amplitude. In the Austenitic state, stress-activation causes the elements 20 to transition to the softer Martensitic state, where they are more able to be stretched under the tensile load.

All of these effects will automatically reverse once heating of a normally Martensitic SMA or loading of a normally Austenitic SMA element 20 ends. Where necessary to effect the original condition (i.e., geometric shape, stiffness, tensile strength, and/or pre-strain), a biasing element 22, such as an elastomeric member, may further comprise the webbing 14. For example, as previously mentioned, the belt segments 26 may be resistively stretchable. In a preferred embodiment, normally Martensitic SMA elements 20 may be combined with elastically compressible filaments to form selectively activated threads that are able to contract and therefore stiffen the webbing 14 on-demand, but then caused to return by the stored energy in the filaments, once deactivated. Alternatively, the retractor 18 may be spring biased by a torsion spring (not shown) that acts antagonistically to the applied tension.

In a preferred embodiment, the belt 10 is further configured to lock the retractor 18 either on-demand or based on pre-crash sensing or crash triggering. For example, if the retractor 18 is not locked such as in the case of pre-crash sensing, and the retractor 18 is an inertial one whose locking is based on rapid spool out, the shortening of the SMA and subsequent rapid spool out of webbing 14 through the retractor 18 may be cooperatively configured to cause the retractor 18 to lock.

As further shown in FIG. 3, the preferred embodiment of the invention includes at least one sensor 28 operable to detect a condition or event. The sensor 28 is communicatively coupled to the element 20 and configured to cause its activation upon detection. More preferably, a controller 30 is communicatively coupled to the element 20, sensor 28, and a signal source (e.g., the charging system of a vehicle) 32, and operable to cause the element 20 to be exposed to or occluded from the activation signal only when the condition or event is detected. For example, the controller 30 and sensor 28 may be cooperatively configured to determine (i.e., detect and/or predict) occupant anthropometry, position, or preference, the ignition of a vehicular engine, shifting a vehicular transmission into drive, buckling or unbuckling the belt 10, a pre-crash condition, or a crash event.

Where a plurality of elements 20 compose the belt 10, the source 32 is preferably coupled to each element 20 individually, so that the controller 30 is able to active each element separately. Here, it is appreciated that where individually activated elements 20 are provided, the controller 30 and/or source 32 are preferably configured to sequentially, or simultaneously activate the elements 20, so as to effect even transformation along the profile of the webbing 14. Moreover, in certain instances, such as with respect to a pre-crash condition or crash event, the preferred controller 30 and sensor 28 are cooperatively configured to further determine a crash characteristic such as the closing velocity of the vehicle, vehicle crush pulse, and the type of object being impacted, and to tailor the response accordingly by activating a pre-determined array of elements 20. That is to say, depending on how many of the SMA elements 20 are activated, the preferred belt 10 is operable to tune/adjust the second strength, stiffness, etc. to one of a plurality of achievable second tensile strengths, stiffness, etc., based for example, on crash severity and occupant anthropometry. Finally, the preferred controller 30 is further equipped with a timer, so as to be operable to terminate activation after a predetermined period relative to the condition has elapsed.

This written description uses examples to disclose the invention, including the best mode, and also to enable any person skilled in the art to make and use the invention. It is appreciated that suitable algorithms, processing capability, and sensor selection/inputs are well within the skill of those in the art in view of this disclosure. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

What is claimed is:

1. A restraining belt webbing adapted to secure an occupant or cargo under a tensile load, defining a first longitudinal axis, and presenting a first tensile load strength and longitudinal profile when under the load, said webbing comprising:
   at least one active material element defining a second longitudinal axis, and operable to undergo a reversible change in a fundamental property when exposed to or occluded from an activation signal, so as to be activated and deactivated respectively, wherein the change is configured to modify the tensile load strength to a second strength less than the load and at least a portion of said at least one element is oriented such that the second axis traverses the first axis.

2. The belt webbing as claimed in claim 1, wherein said at least one element is formed of an active material selected from the group consisting essentially of shape memory alloy, ferromagnetic shape memory alloy, and electroactive polymer.

3. The belt webbing as claimed in claim 1, wherein said at least one element presents a plurality of shape memory alloy wires in the normally Austenitic state and causable to transform to the Martensitic state when exposed to a stress activation signal.

4. The belt webbing as claimed in claim 1, wherein said at least one element presents a plurality of SMA wires in the normally Martensitic state and causable to transform to the Austenitic state when exposed to a thermal activation signal.

5. The belt webbing as claimed in claim 1, wherein a plurality of elements are separately coupled to at least one signal source, so as to be individually exposed to a respective activation signal.

6. The belt webbing as claimed in claim 1, wherein a plurality of elements are coupled to a signal source and equally spaced along the profile, and the source is configured to simultaneously expose the elements to the signal, so that the second strength is constant across the profile.

7. The belt webbing as claimed in claim 1, wherein the element is pre-strained up to 8%.

8. The belt webbing as claimed in claim 1, wherein the webbing is drivenly coupled to a retractor, and the change is further operable to cause the retractor to lock.

9. The belt webbing as claimed in claim 1, wherein the webbing presents a first geometric shape, the change is operable to modify the shape, and the webbing further comprises at least one biasing element operable to return the belt to the original shape, when the change is reversed.

10. The belt webbing as claimed in claim 1, wherein said at least one element presents a geometric configuration selected from the group consisting essentially of fibers, planar strands or strips, threads, braids, filaments, and weaves.

11. The belt webbing as claimed in claim 10, wherein said at least one element defines a longitudinal axis, and the axis is oriented parallel to the profile.

12. The belt webbing as claimed in claim 10, wherein said at least one element defines a longitudinal axis traversing the profile.

13. The belt webbing as claimed in claim 10, wherein said at least one element defines a sinuous longitudinal configuration presenting first and second amplitudes, and cooperatively defining the first and second tensile load strengths, when activated and deactivated, respectively.

14. A method of modifying the tension in a restraining belt comprising a webbing and at least one pre-strained active material element, said method comprising;
 a. securing the belt relative to an occupant or cargo, so as to restrain the occupant or cargo and present a first tension in the webbing;
 b. exposing the element to or occluding the element from an activation signal so as to cause the element to undergo a reversible change in a fundamental property; and
 c. modifying the belt, so as to present a second tension in the webbing, as a result of the change.

15. The method as claimed in claim 14, wherein said at least one element is formed of shape memory alloy in a normally Martensitic state, step a) further includes the steps of exposing the element to a thermal activation signal so as to transform the element to the Austenitic state and present the first tension, and step c) further includes the steps of occluding the element from the signal so as to allow the element to transform back to the Martensitic state, and present the second tension.

16. The method as claimed in claim 14, wherein said at least one element is formed of shape memory alloy in a normally Martensitic state, and step b) further includes the steps of exposing the element to or occluding the element from a thermal activation signal.

17. The method as claimed in claim 14, wherein said at least one element is formed of shape memory alloy in a normally Austenitic state, and step b) further includes the steps of exposing the element to or occluding the element from a stress activation signal.

18. The method as claimed in claim 14, wherein the webbing comprises the element and presents a first tensile strength corresponding to the first tension, and step c) further includes the steps of modifying the tensile strength, so as to achieve the second tension.

19. The method as claimed in claim 14, wherein the element is communicatively coupled to at least one sensor, and step b) further includes the steps of determining a condition or event, and causing the change only when the condition or event is determined.

20. The method as claimed in claim 19, wherein the belt is a vehicular seat belt, and the condition or event is selected from the group consisting essentially of the ignition of a vehicular engine, shifting a vehicular transmission into drive, buckling or unbuckling the belt, a pre-crash condition, or a crash event.

* * * * *